US009326096B1

(12) United States Patent
Gatmir-Motahari et al.

(10) Patent No.: US 9,326,096 B1
(45) Date of Patent: Apr. 26, 2016

(54) METHOD AND APPARATUS FOR MANAGING USE OF LOCATION DETERMINATION

(71) Applicant: Sprint Spectrum L.P., Overland Park, KS (US)

(72) Inventors: Sara Gatmir-Motahari, Redwood City, CA (US); Kosol Jintaseranee, Millbrae, CA (US); Kevin John Soo Hoo, Hillsborough, CA (US); Mark Evans, El Granada, CA (US)

(73) Assignee: Sprint Spectrum L.P., Overland Park, KS (US)

( * ) Notice: Subject to any disclaimer, the term of this patent is extended or adjusted under 35 U.S.C. 154(b) by 29 days.

(21) Appl. No.: 14/132,941

(22) Filed: Dec. 18, 2013

(51) Int. Cl.
*H04W 4/02* (2009.01)
*H04W 24/00* (2009.01)

(52) U.S. Cl.
CPC ........................................ *H04W 4/02* (2013.01)

(58) Field of Classification Search
CPC .... G01S 5/0009; G01S 5/0263; H04W 24/10; H04W 8/04; H04W 8/22; H04W 4/02; H04W 40/20; H04W 48/02
USPC .............. 455/456.1–457, 456.2, 456.3, 404.2
See application file for complete search history.

(56) References Cited

U.S. PATENT DOCUMENTS

| | | | |
|---|---|---|---|
| 2002/0098851 A1* | 7/2002 | Walczak | G01S 19/48 455/456.5 |
| 2005/0222933 A1* | 10/2005 | Wesby | G06Q 40/00 705/36 R |
| 2008/0227467 A1* | 9/2008 | Barnes | G06Q 30/0259 455/456.2 |
| 2008/0254810 A1 | 10/2008 | Fok et al. | |
| 2008/0287139 A1* | 11/2008 | Carlson | H04W 64/00 455/456.1 |
| 2011/0025496 A1* | 2/2011 | Cova | G01S 5/0027 340/539.13 |
| 2011/0057836 A1* | 3/2011 | Ische | G01S 5/0009 342/357.43 |
| 2011/0069627 A1* | 3/2011 | Sridhara | G01S 11/06 370/252 |
| 2011/0250903 A1* | 10/2011 | Huang | G01S 5/0263 455/456.1 |
| 2011/0269447 A1 | 11/2011 | Bienas et al. | |
| 2011/0287779 A1* | 11/2011 | Harper | 455/456.1 |
| 2013/0294266 A1* | 11/2013 | Lim et al. | 370/252 |
| 2014/0113674 A1* | 4/2014 | Joseph | H04W 4/021 455/519 |
| 2014/0162693 A1* | 6/2014 | Wachter | H04W 4/021 455/456.3 |
| 2014/0194145 A1* | 7/2014 | Do | G01S 5/0252 455/456.3 |
| 2014/0211691 A1* | 7/2014 | Emadzadeh et al. | 370/328 |
| 2015/0024782 A1* | 1/2015 | Edge | 455/456.3 |
| 2015/0094085 A1* | 4/2015 | Agrawal | A01K 1/0114 455/456.1 |
| 2015/0105099 A1* | 4/2015 | Luo | H04W 64/003 455/456.1 |
| 2015/0111600 A1* | 4/2015 | Liu | H04W 4/02 455/456.1 |
| 2015/0133166 A1* | 5/2015 | Edge | H04W 4/043 455/456.3 |
| 2015/0201305 A1* | 7/2015 | Edge | H04W 4/02 455/456.3 |

* cited by examiner

*Primary Examiner* — Allahyar Kasraian
*Assistant Examiner* — B. M. M Hannan

(57) ABSTRACT

A method and apparatus to help detect that a particular location determination process is unreliable and to help exclude location fixes established with that location determination process from being used as a basis to provide a location-based service. In accordance with the disclosure, a server may receive at least three location fixes for a mobile station, all corresponding with each other in time and each established with a different location determination process, and the server may determine that one of the location fixes is relatively far away from the other location fixes and therefore that the location determination process used to establish that location fix is unreliable. In response to determining that the location determination process is unreliable, the server or another entity may then exclude location fixes established with that location determination process from being used as a basis to provide a location-based service.

20 Claims, 5 Drawing Sheets

METHOD AND APPARATUS FOR MANAGING USE OF LOCATION DETERMINATION

BACKGROUND

Unless otherwise indicated herein, the materials described in this section are not prior art to the claims and are not admitted to be prior art by inclusion in this section.

In a typical market area, a wireless service provider may operate one or more radio access networks (RANs) each arranged to provide mobile stations with wireless communication service. Each such a RAN may include a number of base stations that radiate to define wireless coverage areas in which to serve mobile stations according to a radio access technology such as Orthogonal Frequency Division Multiple Access (OFDMA (e.g., Long Term Evolution (LTE) or Wireless Operability for Microwave Access (WiMAX)), Code Division Multiple Access (CDMA) (e.g., 1×RTT and 1×EV-DO), GSM, GPRS, UMTS, EDGE, iDEN, TDMA, AMPS, MMDS, WIFI, and BLUETOOTH, or others now known or later developed. In turn, each base station may be coupled with network infrastructure that provides connectivity with one or more transport networks, such as the public switched telephone network (PSTN) and/or the Internet for instance. With this arrangement, a mobile station within coverage of a RAN may engage in air interface communication with one or more base stations and may thereby communicate via the base station(s) with various remote network entities or with other mobile stations served by the base station(s) or by other base stations.

As a mobile station is served by one or more such RANs, various network entities may establish records of associated information, to facilitate billing or other functions. Each such record may include an identifier of the mobile station and a timestamp specifying the date and time of the underlying data. Further, some such records may include information specifying one or more coverage areas in which the mobile station is operating or that the mobile station detects, as well as information related to distance of the mobile station from various base stations or the like.

For instance, such records may specify cells and cell sectors (e.g., by cell ID and sector ID) serving the mobile station or detected by the mobile station, locations of the base stations providing those cells and cell sectors, round trip signal delays between the mobile station and various base stations when the mobile station is in particular cells and cell sectors, and signal strengths detected by the mobile station from various base stations when the mobile station is in particular cells and cell sectors. In practice, the mobile station may report some or all of this information while the mobile station is served by one or more RANs, and various network entities may add or supply other associated information. Serving nodes of various types, such as mobile switching centers (MSCs), radio network controllers (RNCs), and mobility management entities (MMEs), may then record this information, possibly in conjunction with other information, in records related to registration of the mobile station in various coverage areas, handoff of the mobile station between coverage areas, calls or other communications in which the mobile station engages, and so forth.

Further, from time to time, various network entities may use this and/or other information to determine and record the geographic location of mobile stations with varying degrees of granularity, to facilitate providing location-based services such as navigation guidance, delivery of location-based marketing information, or the like, or for other reasons.

For example, by referring to a record specifying that a mobile station was operating in coverage of a particular cell sector at a given time, a server could approximate and record the location of the mobile station at that time as being the location of the base station providing that cell sector, as being a predefined centroid of that cell sector, or the like. As another example, by referring to data specifying that a mobile station was operating in two or more particular cell sectors at a given time, a server could average such cell-sector based locations and/or could apply trilateration based on round-trip delay measurements and/or signal strength measurements, to compute a location of the mobile station with greater granularity.

As still another example, a server could determine the location of a mobile station with even greater granularity through use of the global positioning system (GPS) or the like. For instance, after roughly approximating the location of the mobile station in a manner such as one of those noted above, the server could instruct the mobile station to tune to satellites in the sky over that roughly approximated location and could then receive satellite signal measurements from the mobile station. The server may then use those signal measurements to conduct a trilateration process so as to more accurately determine the mobile station's location. Still further, in an assisted-GPS process, the server could use a combination of satellite signal measurements and round trip delay or other cellular coverage measurements to determine the mobile station's location more quickly and/or with possibly greater accuracy.

To provide a location-based service based on the location of a mobile station, a server may ascertain the location of the mobile station by applying one or more location determination processes such as these or otherwise by ascertaining the location of the mobile station determined through one or more location determination processes such as these. In the event multiple such location fixes are available using different location determination processes (such a location fix based on round trip delay measurements with respect to one RAN serving the mobile station, and a separate location fix based on round trip delay measurements with respect to another RAN serving the mobile station), the server could combine the location fixes together such as by averaging them to establish a representative mobile station location, and/or the server could select one of the available location fixes as a representative mobile station location. The server may then query a database to obtain information keyed to that mobile station and may deliver that location-based information to the mobile station or to another entity.

OVERVIEW

In some situations, due to network calibration problems or other issues, certain location determination processes may not be especially reliable. For example, if a particular base station has an error in calibration of its signal timing or the like, the round trip delay measurement that a mobile station determines with respect to that base station may be erroneous. Consequently, if that round trip delay measurement is used as a basis to determine the location of the mobile station, and in turn as a basis to provide a location-based service, the determined location may be skewed and the location-based service may be flawed. And another example, if data indicating the locations of a particular base station or coverage area centroids or the like is in error, mobile station locations determined based on such locations may be in error as well. Other examples are possible as well.

Disclosed herein is a method and apparatus to help detect that a particular location determination process is unreliable and to help exclude location fixes established with that location determination process from being used as a basis to provide a location-based service (e.g., a service or a product based on mobile station location). In accordance with the disclosure, a server may receive at least three location fixes for a mobile station, all corresponding with each other in time and each established with a different location determination process, and the server may determine that one of the location fixes is relatively far away from the other location fixes and therefore that the location determination process used to establish that location fix is unreliable. In response to determining that the location determination process is unreliable, the server or another entity may then exclude location fixes established with that location determination process from being used as a basis to provide a location-based service.

In practice, this could be done on a per location area basis. For instance, a location determination process may be deemed unreliable for a particular location area, such as an area defined by the various location fixes that were subject to the analysis, or such as a particular cell sector in which a mobile station whose location was the subject of the location fixes was operating. In turn, the act of excluding location fixes established with the location determination process from use as a basis to provide a location-based service could be carried out when a location at issue is one within the particular location area.

Further, this can be carried out based on multiple comparisons for possibly multiple mobile stations in a location area. For instance, in a given location area, a server could determine that a particular location determination process is unreliable based on comparisons of location fixes for one mobile station, and also based on comparisons of location fixes for other mobile stations, and the server or another entity could then exclude location fixes established with that location determination process from being used as a basis to provide a location-based service.

According, in one respect, disclosed is a method for managing use of location determination. The method involves receiving into a network server three or more location fixes established for a mobile station, the location fixes corresponding with each other in time but being established by different respective location determination processes. Further, the method involves the network server determining that one of the received location fixes is an outlier compared with the other received location fixes, the one determined location fix having been established by a particular location determination process. And the method further involves, in response to determining that the one received location fix is an outlier, excluding from use as a basis to provide a location-based service a location determined by the particular location determination process.

In another respect, the method may involve receiving into a network server a plurality of location fixes established for a plurality of mobile stations, each location fix having a respective mobile station identifier and a respective timestamp. Further, the method may involve, based at least in part on the mobile station identifiers and timestamps of the received location fixes, the network server identifying at least one group of three or more of the received location fixes having a common mobile station identifier and having corresponding timestamps, where the location fixes in each group were established by different location determination processes than each other. The method may then involve the network server determining that a particular location determination process is unreliable by at least, for each group of the at least one group, determining that one of the location fixes of the group is an outlier compared with the other location fixes of the group and determining that the one determined location fix was established by the particular location determination process. Further, the method may involve, in response to determining that the particular location determination process is unreliable, excluding from use as a basis to provide a location-based service a location determined by the particular location determination process.

Still further, disclosed is a network server that includes a network communication interface, a processing unit, data storage, and program instructions stored in the data storage and executable by the processing unit to carry out various functions. The functions may include receiving via the network communication interface from at least one other server a plurality of location fixes established for one or more mobile stations in a particular location area, each location fix having an associated mobile station identifier and timestamp. Further, the functions may include grouping the received location fixes into one or more groups of three or more location fixes each, based at least on commonality of mobile station identifiers and correspondence of timestamps, wherein the location fixes of each group were each established using different location determination processes than each other. The functions may then include determining, for at least one of the one or more groups of location fixes, that a particular location determination process provides unreliable location determination in the particular location area and, responsive to the determining, excluding the particular location determination process from use as a basis to provide a location-based service for one or more mobile stations in the particular location area.

These as well as other aspects, advantages, and alternatives will become apparent to those of ordinary skill in the art by reading the following detailed description, with reference where appropriate to the accompanying drawings. Further, it should be understood that the description provided in this overview section and elsewhere in this document is provided by way of example only.

DETAILED DESCRIPTION

Figure 1:
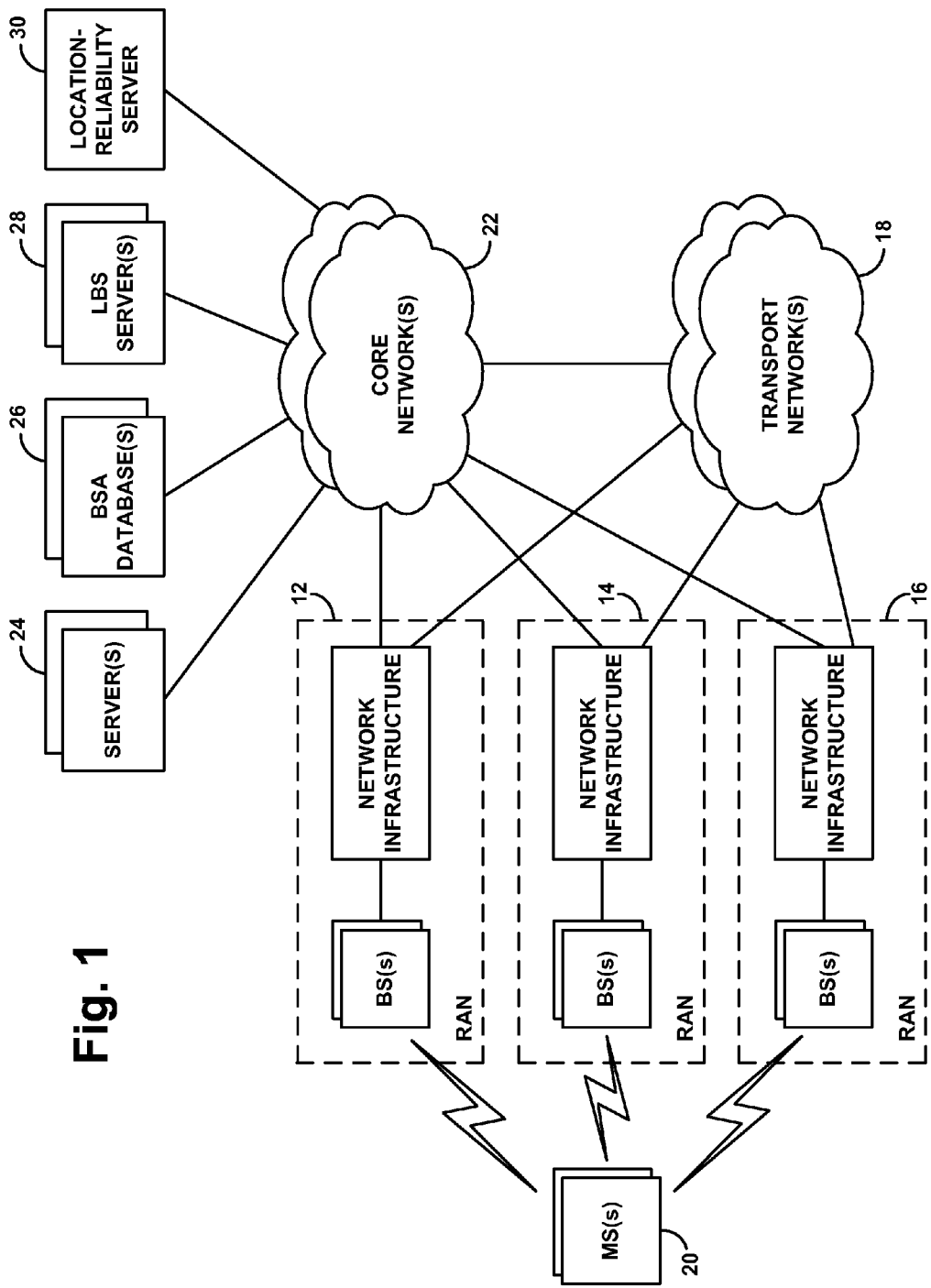
FIG. 1 is a simplified block diagram of an example communication system in which the present method can be implemented.

Referring to the drawings, as noted above, FIG. 1 is a simplified block diagram of an example communication system in which the present method can be implemented. It should be understood that this and other arrangements and processes described herein are set forth for purposes of example only, and other arrangements and elements (e.g., machines, interfaces, functions, orders of elements and functions, etc.) can be added or used instead and some elements may be omitted altogether. Those skilled in the art will also appreciate that many of the elements described herein are functional entities that may be implemented as discrete components or in conjunction with other components, in any suitable combination and location, and that various disclosed functions can be implemented by any combination of hardware, firmware, and/or software, such as by one or more processors programmed to execute computer instructions for instance.

As shown in FIG. 1, the example communication system includes three example RANs 12, 14, 16, each of which may operate according to a different radio access technology. For instance, one RAN may be a CDMA 1xRTT RAN, another may be a CDMA 1xEV-DO RAN, and another may be an LTE RAN. For simplicity, each RAN is shown including one or more base stations and supporting network infrastructure that provides or facilitates providing connectivity with one or more transport networks 18 such as the PSTN and/or the Internet. In a 1xRTT RAN, the base stations may be base transceiver stations (BTSs), and the network infrastructure may include a base station controller (BSC), a mobile switching center (MSC), and a packet data serving node (PDSN). In a 1xEV-DO RAN, the base stations may be access nodes (ANs), and the network infrastructure may include an RNC and a PDSN. And in an LTE RAN, the base stations may be eNodeBs, and the network infrastructure may include an MME, a serving gateway (SGW), and a packet-data network gateway (PGW).

In general, each base station may include an antenna structure, power amplifier, and transceiver, and may be configured to radiate so as to define one or more coverage areas such as a cell and one or more cell sectors. Each base station may have a unique base station identifier, and each coverage area may have a unique coverage area identifier, and the base station and supporting infrastructure may have records of these identifiers, to facilitate recording the identifiers when establishing records of mobile station operation. Further, each base station and coverage area may have other characterizing information, such as geographic location, azimuth, coverage range, centroid, and the like, and the base station and supporting infrastructure may also have records of this information to facilitate recording the information when establishing records of mobile station operation.

In practice, the base stations may include macro base stations of the type typically covering a wide area and often including antennas mounted on tall towers or other structures. Alternatively or additionally, the base stations may include femtocells, small cells, or the like, which may have a smaller form factor and be configured for use within homes, offices, or other areas and to connect with the supporting network infrastructure through broadband connections or other means.

FIG. 1 also depicts one or more representative mobile stations 20 that may be configured to be served by one or more of the illustrated RANs. These mobile stations could include cell phones, wirelessly equipped tablets or other computers, tracking devices, or other wireless communication devices now known or later developed. In practice, any of these mobile stations may support service from just one of the RANs, under a particular radio access technology, or may be a multi-mode mobile station that supports service from multiple RANs with different radio access technologies. Each mobile station may have a unique mobile station identifier, such as an international mobile subscriber identity (IMSI), a mobile station identifier (MSID), a mobile identification number (MIN), an electronic serial number (ESN), or the like, which the mobile station may report to a serving RAN when registration and/or engaging in other communications via the RAN.

A representative multi-mode mobile station may include separate, but possibly integrated, radios for communicating with particular types of RANs and may be arranged to engage in communication concurrently with different RANs or may transition between being served by one RAN and being served by another RAN. For example, a mobile station that supports both LTE and 1xRTT operation may connect with an LTE RAN to engage in wireless packet data communication such as Internet communication (e.g., web browsing, e-mail communication, file transfer, voice over Internet Protocol (VoIP), and the like) but may connect with a 1xRTT RAN to engage in legacy PSTN voice call communication. As another example, a mobile station that supports both 1xRTT and 1xEV-DO operation may connect with a 1xRTT RAN to engage in a call or other network interaction and may then transition to connect with a 1xEV-DO RAN to engage in data communication with various servers or other entities. Other examples are possible as well.

As further shown in the figure, the network infrastructures of the various example RANs are then communicatively linked with one or more core networks 22. The core network(s) may be private packet-data networks operated by one or more wireless service providers, to facilitate routing of signaling and bearer communications between various network entities operated by the service provider(s) and may also provide the above-indicated connectivity with one or more transport networks. In practice, some or all of the RANs may be operated by a common wireless service provider, and that service provider may operate a core network shared by the RANs. Alternatively, some or all of the RANs may be operated by different wireless service providers, and each wireless service provider may operate its own core network. Further, where multiple core networks are provided, they may be interconnected, to facilitate signaling between them.

Shown on the core network(s) are then various servers 24, which may function to receive information from the network infrastructure of various RANs and determine locations of mobile stations using various location determination processes. Some of these servers may be in place specifically for receiving, storing, and/or analyzing data from just one particular RAN, and others may be in place for receiving, storing, and/or analyzing data from multiple RANs. Further, these server may include intermediate entities that receive and store data from RANs and then provide the data, possibly in another form, to one or more other entities. For instance, these servers may include per call management data (PCMD) servers per RAN or across RANs, which may receive records of registrations, calls, or other service related to mobile stations served by particular RANs, which may include information such as call duration and network based positioning measurements (established by mobile stations and/or various base stations or other entities) such as round trip delay measurements, signal strength measurements, as well as identifiers and locations of base stations, sectors, and the like. As discussed above, this data may be timestamped and indicate mobile station identifiers.

In addition, shown on the core network(s) are one or more base station almanac (BSA) databases 26, which could be distributed, replicated, and/or integrated with various ones of the illustrated servers. A representative base station almanac may hold data defining certain characteristics of base stations and coverage areas of a RAN, such as geographic locations of base stations, coverage scope, centroid locations, azimuths, and the like, with the data being keyed to identifiers of such base stations and coverage areas for instance. Various servers may then be configured to refer to this BSA data to obtain such information based on records that indicate mobile stations were served by particular base stations and/or in particular coverage areas at particular times, so as to facilitate determining locations of those mobile stations at those times.

In practice, various ones of the illustrated servers may be configured to receive and analyze data and determine mobile station locations periodically or in response to various triggers. For instance, a server may evaluate data and determine mobile station location in response to receiving the data, or a server may compile received data over time and periodically analyze the data to determine and record mobile station locations. Further, various ones of the servers may be configured to communicate not only with network infrastructure and other network entities but perhaps also with mobile stations, through control plane (e.g., signaling) and/or user plane (e.g., bearer data) connections, to receive and report locations and/or underlying data.

Location determination processes carried out by these or other entities may take a variety of forms, differing from each other in various ways. One example location determination process may involve analyzing PCMD records and/or other records from a particular RAN, and perhaps referring to associated BSA data, to determine (e.g., approximate) as a mobile station's location a centroid of a single cell sector that was serving the mobile station. Another example location determination process may involve analyzing PCMD records and/or other records from a particular RAN, and perhaps referring to BSA data, to ascertain base station location and reported round trip delay (RTD) with respect to a single cell sector serving the mobile station and to determine as the mobile station's location a location along the azimuth of the serving base station in accordance with that RTD. And still another example location determination process may involve analyzing PCMD records and/or other records from a particular RAN, and perhaps referring to BSA data, to ascertain base station locations and reported RTD with respect to multiple cell sectors serving the mobile station and to apply trilateration (e.g., advanced forward trilateration (AFLT) based on that information so as to estimate a location of the mobile station.

Each of these or other example location determination processes may be specific to a particular RAN from which the underlying data was established. Thus, the above-noted location determination processes might include a 1×RTT sector centroid process, a 1×EV-DO sector centroid process, an LTE sector centroid process, a 1×RTT single sector RTD azimuth process, a 1×EV-DO single sector azimuth process, an LTE single sector RTD azimuth process, a 1×RTT AFLT process, a 1×EV-DO AFLT process, and perhaps an LTE AFLT process.

Furthermore, various ones of the servers may carry out still other location determination processes. For example, a server may carry out a process to determine mobile station location using GPS or other satellite-based positioning. In this process, for instance, the server may first obtain RTD measurements and use those measurements, with AFLT or the like, to establish a coarse estimate of the mobile station's location. The server may then provide the mobile station with satellite ephemeris data that enables the mobile station to tune to satellites in the sky over that estimated location. Alternatively, the mobile station may autonomously scan for applicable satellite signals. The mobile station may then report satellite signal measurements to the server, and the server may use those measurements to compute the mobile station's location. Alternatively, the mobile station may use the measurements to compute its location and may report the location to the server. As another example, a server may carry out an assisted GPS (AGPS) process, in which the server takes into account both satellite signal measurements provided by the mobile station and RTD or other cellular signal measurements, to compute the mobile station's location.

As various servers determine mobile station location through use of various different location determination processes, the servers may store the determined mobile station locations (location fixes) for later reference and/or more report the determined locations to various other entities. Optimally, each determined location may represent the location as geographic coordinates, such as latitude and longitude coordinates, and may be stored in a record specifying the associated mobile station identifier, timestamp of the underlying data (thus indicating when the mobile station was at the determined location), and a name, code, or other identifier of the location determination process used to determine the location. The servers may store these determined locations themselves, or the servers may report the determined locations to a central repository, which may store the determined locations for reference by one or more other network servers.

Further shown by way of example on the core network(s) in FIG. 1 are one or more location-based service (LBS) servers 28. These LBS servers may facilitate providing location-based services, such as information or functionality keyed to mobile station location. As such, these LBS servers could include servers that themselves provide location-based services, such as navigation servers that deliver routing guidance based on mobile station location, ad-delivery servers that deliver ads based on mobile station location, or alert servers that deliver alerts based on mobile station location.

Such LBS servers may be configured to receive records of determined mobile station locations from other servers such as those noted above, and/or from the mobile stations themselves, and to use the determined mobile station locations as a basis to provide location-based services. For instance, in response to a request for location-based information that would be keyed to location of a particular mobile station, an LBS server may request and receive from various other servers one or more location fixes established for the mobile station, and to the extent the LBS server receives multiple such location fixes, the LBS server may combine the location fixes together such as by averaging them, to establish a representative estimate of the mobile station's location. The LBS server may then refer to location-based information, such as mapping data or the like, to find corresponding location-based information and may deliver the location-based information to the requesting party.

Further, the LBS servers may also include servers that enable other servers to provide location-based services. Such servers, for instance, may function to obtain from other servers various mobile station location fixes established with various different location determination processes, to average or otherwise aggregate those location fixes, and to provide representative location fixes to other LBS servers that may then use those location fixes to provide location-based services.

Additionally shown by way of example on the core network(s) is a location-reliability server 30, which may be configured to carry out features specific to the present method. In particular, the location-reliability server may be arranged to evaluate various location fixes established with different location determination processes, and to thereby determine that a particular location determination process is unreliable. Based on that determination, the particular location determination process can then be excluded from use as a basis to provide a location-based service.

Figure 2:
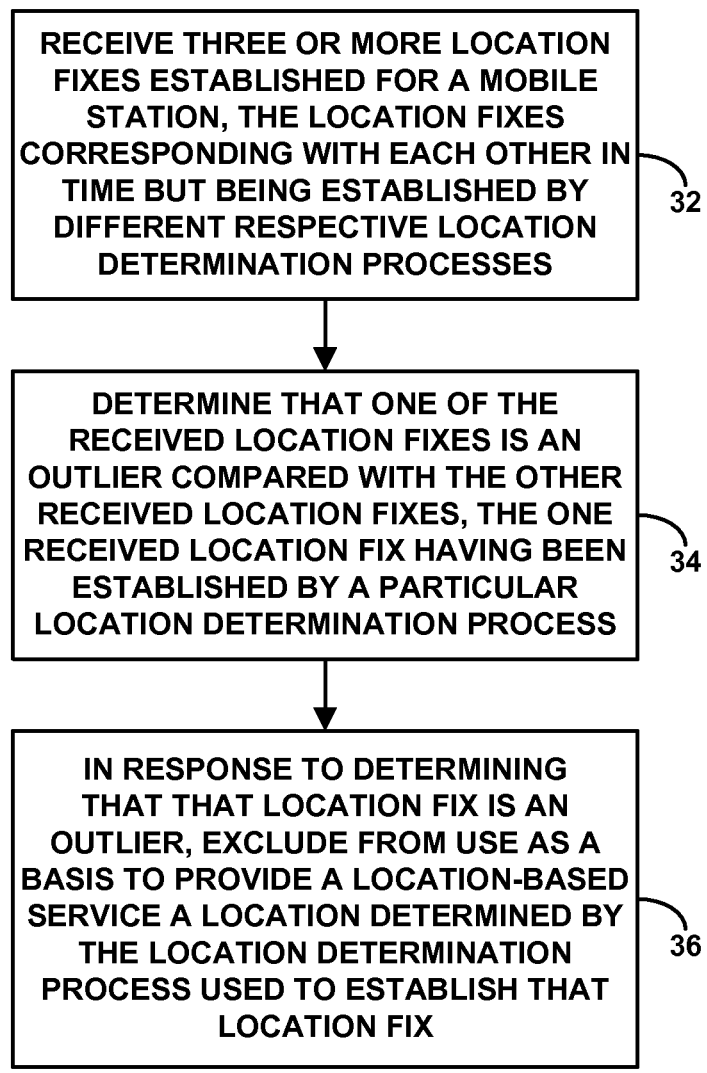
FIG. 2 is flow chart depicting example functions that can be carried out in an example implementation of the method.

FIG. 2 is a flow chart depicting functions that such a location-reliability server 30 may carry out in practice. As shown in FIG. 2, at block 32, the server 30 may receive three or more location fixes established for a mobile station, the location fixes corresponding with each other in time but being established by different respective location determination processes. In practice, for instance, the server may receive these location fixes from various other servers as noted above, and all of the location fixes may be for the same mobile station identifier and have timestamps that correspond with each other by being within a threshold time of each other, but as noted each location fix would have been established with a different location determination process.

Multiple such location fixes for a given mobile station may be established in various situations. By way of example, if an LBS application running on a mobile station is going to request a network based LBS server to provide location-based information based on the location of the mobile station, the LBS application may request location of the mobile station. In turn, the mobile station may responsively establish a 1×RTT network connection. When that happens, a BSC may then establish a 1×RTT PCMD record for the mobile station, and a server may receive that record and compute mobile station location through a 1×RTT single sector azimuth process, an 1×RTT AFLT process, or another process. Through the 1×RTT connection, the mobile station may then communicate with another server such as a position determining entity, which may determine the location of the mobile station using GPS or AGPS or another process and may report the determined location to the mobile station.

The mobile station may then establish a 1×EV-DO or LTE network connection to communicate with an LBS server. And the 1×EV-DO or LTE network infrastructure may therefore establish an associated PCMD record for the mobile station, and a server may receive that record and compute the mobile station location through yet another location determination process. Through the 1×EV-DO or LTE connection, the mobile station may then communicate with an LBS server, and the LBS server may use any of these other location fixes for the mobile station to facilitate providing the requested location based information.

Through these steps, various location fixes would thus be established for the mobile station, all keyed to the same mobile station identifier, and having corresponding timestamps, such as timestamps within some defined time of each other that is deemed short enough to suggest that the location fixes are all for a common event or for when the mobile station was in approximately the same location.

Figure 3:
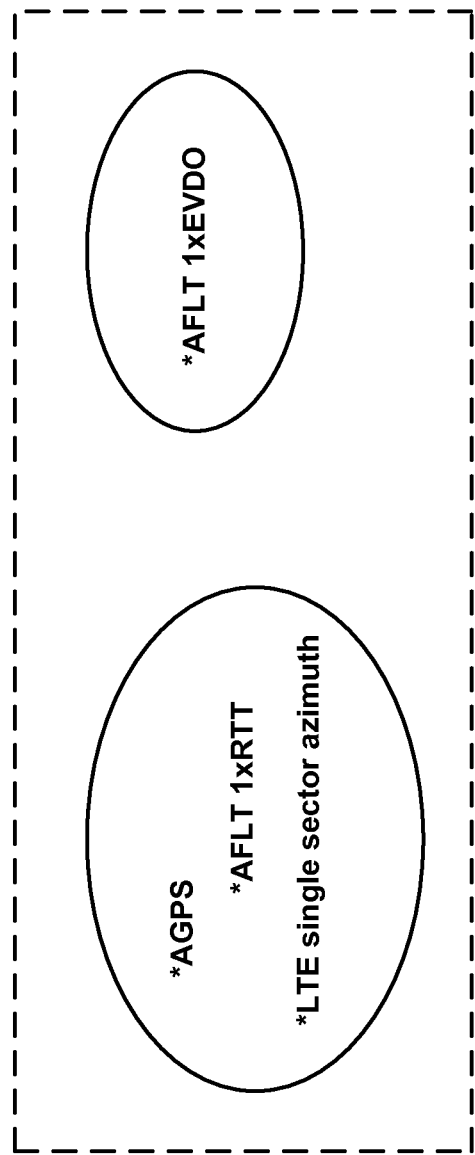
FIG. 3 is a depicting of multiple location fixes for a mobile station, with one location fix being an outlier.

Continuing with reference to FIG. 2, at block 34, the server may then determine that one of the received location fixes is an outlier compared with the other received location fixes, that one received location fix having been established by a particular location determination process. FIG. 3 illustrates example location fixes to help explain this part of the process. In particular, FIG. 3 depicts a set of location fixes for a given mobile station corresponding with each other in time, including an AGPS fix, an AFLT 1×RTT fix, an LTE single sector azimuth fix, and an AFLT 1×EV-DO process. As shown in the figure, the AGPS, AFLT 1×RTT, and LTE single sector azimuth fixes are all somewhat close to each other, but the AFLT 1×EV-DO fix is relatively far away from the others, suggesting that the AFLT 1×EV-DO fix is an outlier and that AFLT 1×EV-DO location determination is unreliable. This may be due to an error in calibration of a 1×EV-DO base station for instance.

To determine that one of the location fixes is an outlier, the server may compute distances between pairs of the location fixes and may determine from those distances that one of the location fixes is relatively far away from each other of the location fixes. The server may then deem that one location fix to be an outlier. Further or alternatively, the server could apply a hierarchical clustering process, which is a type of data analysis known in the industry, to determine that a particular one of the location fixes is an outlier.

At block 36, in response to determining that a particular one of the location fixes is an outlier, the server or another entity may then exclude from use as a basis to provide a location-based service a location determined by the location determination process used to establish that location fix. In practice, for instance, the server may determine which location determination process was used to establish the outlier location-fix, and the server may then flag that location determination process to not be used as a basis to provide a location-based service.

More particularly, the server may signal to one or more other servers that store, provide, or use location fixes for providing location-based service, to notify each such server that location fixes established with that location determination process are not to be used. Each such other server may then forgo use of any location fix established with that location determination process, unless and until notified that the process becomes reliable for instance. For instance, the server may signal to an LBS server to notify and cause the LBS server to not use such location fixes. Or the server may signal to a server that stores and provides location fixes, to notify and cause that server to not provide such location fixes. Other implementations are possible as well.

In the method of FIG. 2, the act of receiving the three or more location fixes established for the mobile station may involve receiving a plurality of location fixes from a plurality of other network servers and selecting from those received location fixes the three or more location fixes established for the mobile station. In this regard, the selecting may be based at least in part on the three or more location fixes being for the same mobile station and corresponding with each other in time. That is, the server could search through the received location fixes to find and obtain three or more location fixes that have the same mobile statin identifier and that have corresponding timestamps.

As noted above, this method may also be carried out specific to a particular location area, such as an area defined by at least the three or more location fixes subject to the analysis, or such as a particular cell sector in which the mobile station was operating. In that case, the act of excluding from use as a basis to provide the location-based service a location determined by the particular location determination process may also be specific to that location area. To facilitate this, the server may store and perhaps notify one or more other servers of a correlation between the location determination process deemed to be unreliable and the location area. Based on that correlation, if a location fix is later a candidate for use as a basis to provide a location-based service, and the location fix is within such a location area and was established by the location determination process deemed to be unreliable, an LBS server or other server may responsively forgo use of that location fix as a basis to provide a location-based service.

Figure 4:
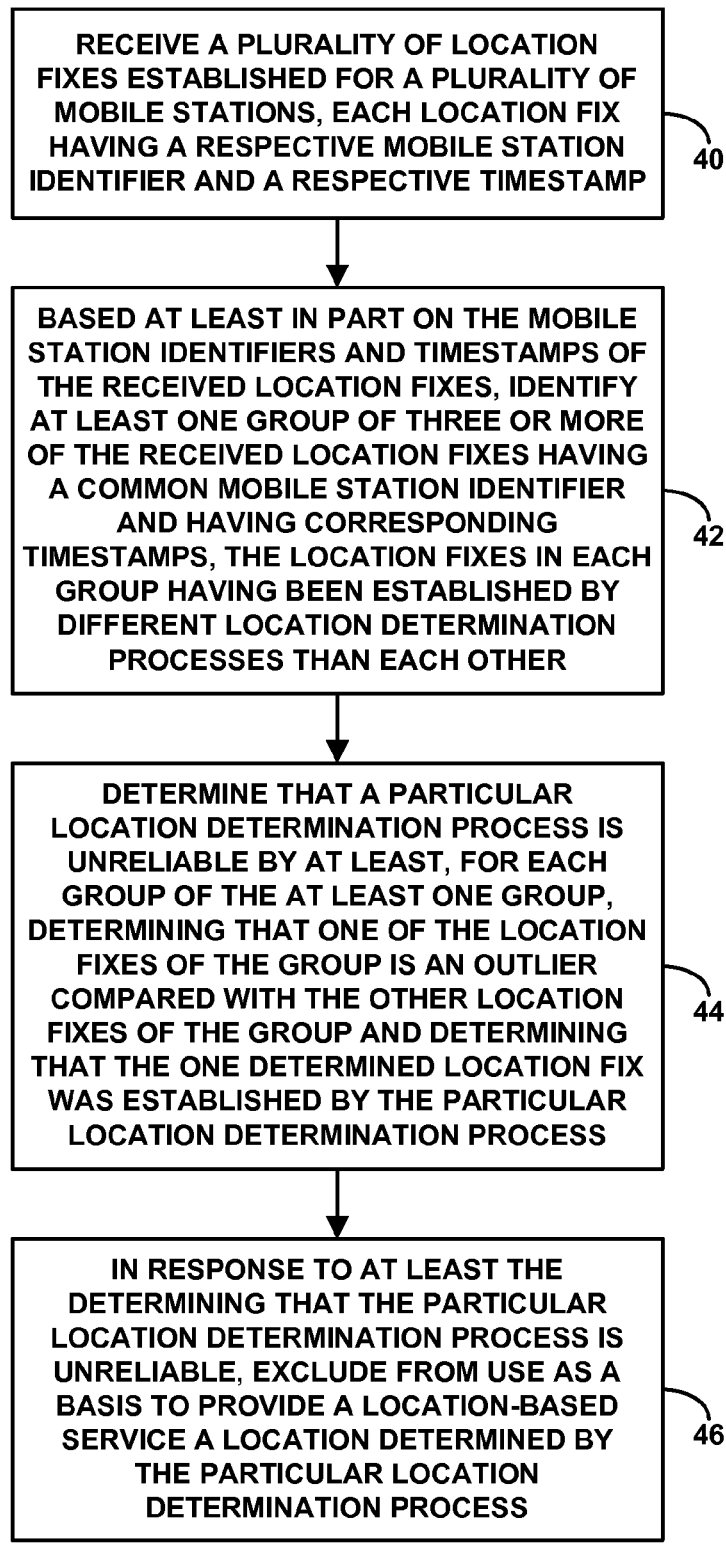
FIG. 4 is another flow chart depicting example functions that can be carried out in an example implementation of the method.

FIG. 4 is next another flow chart depicting functions that can be carried out in accordance with the present method. As shown in FIG. 4, at block 40, a network server may receive a plurality of location fixes established for a plurality of mobile stations, each location fix having a respective mobile station identifier and a respective timestamp. For instance, the network server may receive these fixes from various other network servers like those noted above, reported autonomously from those other servers, or reported from those other servers in response to a query for the fixes.

At block 42, based at least in part on the mobile station identifiers and timestamps of the received location fixes, the server may then identify at least one group of three or more of the received location fixes having a common mobile station identifier and having corresponding timestamps, the location fixes in each group having been established by different location determination processes than each other. For instance, the server may sort the received location fixes based on mobile station identifier and may then sort the fixes further based on correspondence between their timestamps, so as to establish or otherwise identify at least one such group.

At block 44, the server may then determine that a particular location determination process is unreliable by at least, for each group of the at least one group, determining that one of the location fixes of the group is an outlier compared with the other location fixes of the group and determining that the one determined location fix was established by the particular location determination process. In particular, the server may apply a process as described above separately for each such group of location fixes, so as to determine that a location determination process is unreliable. Further, the server may make the same determination with respect to multiple such groups, to help bolster the conclusion that the location determination process is unreliable.

At block 46, in response to at least the determining that the particular location determination process is unreliable, the server or another entity may then exclude from use as a basis to provide a location-based service a location determined by the particular location determination process, in the manner described above for instance.

Here again, this process can be keyed to a particular location area. For instance, the server may engage in this analysis for multiple groups of mobile station location fixes in a particular area, and may find from that analysis that a particular location determination process tends to produce outlier location fixes compared with other location determination processes and is therefore unreliable. The server may therefore flag that location determination process as being unreliable for that location area, so that location fixes established with that process in that location area will not be used as a basis to provide a location-based service.

Figure 5:
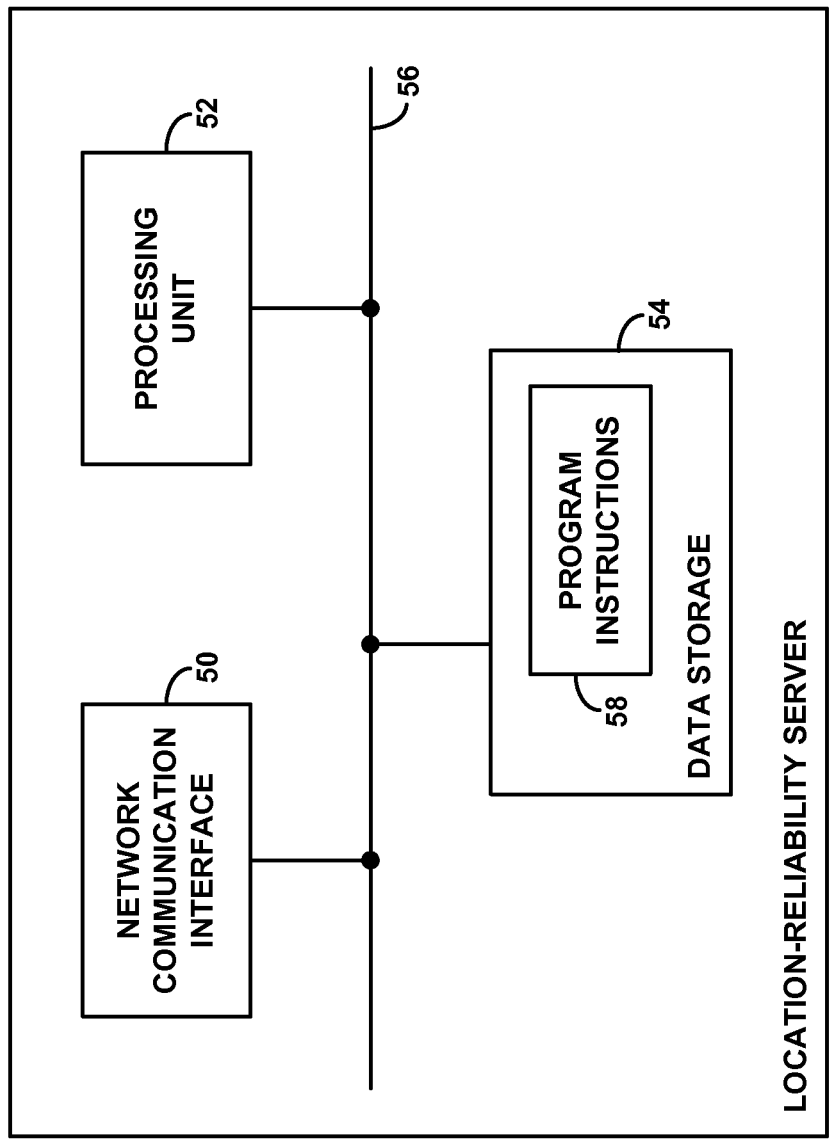
FIG. 5 is a simplified block diagram of a location-reliability server operable in an example implementation of the method.

FIG. 5 is next a simplified block diagram of the location-reliability server, showing some of the functional components that may be included in such a server in accordance with the present method. As shown, the example server includes a network communication interface 50, a processing unit 52, and data storage 54, all of which may be communicatively linked together by a system bus, network, or other connection mechanism 56.

With this arrangement, the network communication interface 50 may function to provide for communication with various other network elements and may thus take various forms, allowing for wired and/or wireless communication for instance. Processing unit 52 may then comprise one or more general purpose processors (e.g., microprocessors) and/or one or more special purpose processors (e.g., application specific integrated circuits) and may be integrated in whole or in part with the network communication interface. And data storage 54 may comprise one or more volatile and/or non-volatile storage components, such as optical, magnetic, or flash memory and may be integrated in whole or in part with the processing unit.

As shown, by way of example, data storage 54 may then hold program instructions 58, which may be executable by processing unit 52 to carry out various functions described herein. For example, the functions may include receiving via the network communication interface from at least one other server a plurality of location fixes established for one or more mobile stations in a particular location area, each location fix having an associated mobile station identifier and timestamp. Further, the functions may include grouping the received location fixes into one or more groups of three or more location fixes each, based at least on commonality of mobile station identifiers and correspondence of timestamps, wherein the location fixes of each group were each established using different location determination processes than each other.

The functions may include determining, for at least one of the one or more groups of location fixes, that a particular location determination process provides unreliable location determination in the particular location area. And the functions may include, in response to the determining, excluding the particular location determination process from use as a basis to provide a location-based service for one or more mobile stations in the particular location area, such as by flagging the process to not be used and/or signaling to one or more other servers to cause them to not use location fixes established with the process.

Exemplary embodiments have been described above. It should be understood, however, that variations from these embodiments are possible, while remaining within the true spirit and scope of the invention.

We claim:

1. A method comprising:
receiving into a network server a plurality of location fixes each defining a location of a mobile station, the plurality of location fixes defining multiple groups of three or more location fixes, wherein the three or more location fixes in each group are established for the same mobile station as each other, and wherein the three or more location fixes in each group correspond with each other in time but are established by different respective location determination processes than each other, wherein each group includes one location fix established by a particular location determination process;
determining by the network server that, in each group of three or more location fixes, the one location fix in the group that was established by the particular location determination process is an outlier compared with the other location fixes in the group; and responsive to at least the determining, excluding, from use as a basis to provide a location-based service, location determined by the particular location determination process.

2. The method of claim 1,
wherein receiving the plurality of location fixes comprises receiving the plurality of location fixes from a plurality of other network servers, and
wherein the method further comprises identifying from among the received plurality of location fixes the multiple groups of three or more location fixes, wherein the identifying the multiple groups is based at least in part on the three or more location fixes in each group being for the same mobile station as each other and corresponding with each other in time.

3. The method of claim 2, wherein each received location fix has an associated mobile station identifier and an associated timestamp, and wherein identifying the multiple groups of three or more received location fixes based at least in part on the three or more location fixes in each group being for the same mobile station as each other and corresponding with each other in time comprises selecting the multiple groups of three or more location fixes based at least in part on the three or more location fixes in each group having a common mobile station identifier and corresponding timestamps.

4. The method of claim 1, wherein determining that the one-location fix in the group that was established by the particular location determination process is the outlier comprises:
  determining distances between pairs of the location fixes in the group; and
  based at least in part on the determined distances, identifying the one location fix as being relatively far away from each other one of the location fixes in the group, and determining that the identified location fix is the outlier.

5. The method of claim 1, wherein determining that the one location fix in the group that was established by the particular location determination process is the outlier comprises applying hierarchical clustering of the received location fixes.

6. The method of claim 1, wherein excluding from use as a basis to provide a location-based service location determined by the particular location determination process comprise excluding from use as a basis to provide a location-based service the particular location determination process.

7. The method of claim 6, wherein providing the location-based service comprises ascertaining mobile station location and using the ascertained mobile station location as a basis to provide location-based information, and wherein excluding the particular location determination process from use as a basis to provide the location-based service comprises excluding the particular location determination process from use as a basis to ascertain mobile station location.

8. The method of claim 1, wherein the multiple groups of three or more location fixes are in a particular location area, and wherein the excluding, from use as a basis to provide the location-based service, location determined by the particular location determination process is specific to the location area.

9. A method comprising:
  receiving into a network server a plurality of location fixes each defining a location of a mobile station, the plurality of location fixes being established for a plurality of mobile stations, each location fix having a respective mobile station identifier and a respective timestamp;
  based at least in part on the mobile station identifiers and timestamps of the received location fixes, identifying by the network server multiple groups of three or more of the received location fixes, each group having a common mobile station identifier and having corresponding timestamps, wherein the three or more location fixes in each group were established by different location determination processes than each other;
  determining, by the network server, that a particular location determination process is unreliable by at least, for each group of the multiple groups, determining that one of the location fixes of the group is an outlier compared with the other location fixes of the group and determining that the one determined location fix was established by the particular location determination process; and
  responsive to at least the determining that the particular location determination process is unreliable, excluding, from use as a basis to provide a location-based service, location determined by the particular location determination process.

10. The method of claim 9, wherein determining that the one location fix of the group is the outlier comprises:
  determining distances between pairs of the location fixes of the group; and
  based at least in part on the determined distances, identifying the one location fix as being relatively far away from each other one of the location fixes of the group, and determining that the one location fix is the outlier.

11. The method of claim 9, wherein determining that the one location fix is the outlier comprises applying hierarchical clustering of the received location fixes.

12. The method of claim 9, wherein excluding from use as a basis to provide a location-based service location determined by the particular location determination process comprise excluding from use as a basis to provide a location-based service the particular location determination process.

13. The method of claim 12, wherein excluding, from use as a basis to provide a location-based service, the particular location determination process comprises flagging the location determination process to not be used.

14. The method of claim 12, wherein providing the location-based service comprises ascertaining mobile station location and using the ascertained mobile station location as a basis to provide location-based information, and wherein excluding the particular location determination process from use as a basis to provide the location-based service comprises excluding the particular location determination process from use as a basis to ascertain mobile station location.

15. The method of claim 9, wherein the plurality of location fixes are in a particular location area, and wherein the excluding, from use as a basis to provide the location-based service, location determined by the particular location determination process is specific to the location area.

16. A network server comprising:
  a network communication interface;
  a processing unit;
  data storage; and
  program instructions stored in the data storage and executable by the processing unit to carry out functions comprising:
  receiving via the network communication interface from at least one other server a plurality of location fixes each defining a location of a mobile station, the plurality of location fixes being established for one or more mobile stations in a particular location area, each location fix having an associated mobile station identifier and timestamp,
  grouping the received location fixes into multiple groups of three or more location fixes each, based at least on commonality of mobile station identifiers and correspondence of timestamps, wherein the three or more location fixes of each group were each established using different location determination processes than each other, and wherein one of the location fixes in each group was established using a particular location determination process,
  determining that, for each group of the multiple groups of location fixes, the particular location determination process provides unreliable location determination in the particular location area, and
  responsive to the determining, excluding the particular location determination process from use as a basis to provide a location-based service for one or more mobile stations in the particular location area.

17. The network server of claim 16, wherein determining that the particular location determination process provides unreliable location determination in the particular location area comprises:
  conducting an analysis comprising, for each group of the multiple groups, determining, based at least in part on distances between pairs of location fixes of the group, that the one location fix in the group that was established by the particular location determination process is an outlier compared with each other location fix in the group; and based at least in part on the analysis, deeming the particular location determination process to provide unreliable location determination in the particular location area.

18. The network server of claim 17, wherein the analysis comprises, for each group, applying hierarchical clustering.

19. The network server of claim 16, wherein providing the location-based service comprises ascertaining mobile station location and using the ascertained mobile station location as a basis to provide location-based information, and wherein excluding the particular location determination process from use as a basis to provide a location-based service for one or more mobile stations in the particular location area comprises excluding, from the ascertaining of mobile station location, location determined by the particular location determination process.

20. The network server of claim 16, wherein excluding the particular location determination process from use as a basis to provide a location-based service for one or more mobile stations in the particular location area comprises flagging the particular location determination process to not be used.

* * * * *